(12) United States Patent
Munro et al.

(10) Patent No.: US 7,983,941 B2
(45) Date of Patent: Jul. 19, 2011

(54) ANALYZING SYSTEM PERFORMANCE, OPERATIONAL PERFORMANCE, AND COSTS OF A SURVEILLANCE SYSTEM

(75) Inventors: Bruce C. Munro, Flower Mound, TX (US); Richard B. Moe, Corinth, TX (US); Lisa A. Fillebrown, Plano, TX (US); Nickolia L. Coombs, Dallas, TX (US); William R. Kelberlau, Georgetown, TX (US); Richard J. Conz, Seminole, FL (US)

(73) Assignee: Raytheon Company, Waltha, MA (US)

( * ) Notice: Subject to any disclaimer, the term of this patent is extended or adjusted under 35 U.S.C. 154(b) by 1138 days.

(21) Appl. No.: 11/549,179

(22) Filed: Oct. 13, 2006

(65) Prior Publication Data

US 2008/0040170 A1    Feb. 14, 2008

Related U.S. Application Data

(60) Provisional application No. 60/822,097, filed on Aug. 11, 2006.

(51) Int. Cl.
*G06Q 10/00* (2006.01)
(52) U.S. Cl. ...................... 705/7.12; 705/7.22
(58) Field of Classification Search .............. 705/7.12
See application file for complete search history.

(56) References Cited

U.S. PATENT DOCUMENTS

| | | | |
|---|---|---|---|
| 5,508,928 A * | 4/1996 | Tran | 342/13 |
| 6,086,618 A | 7/2000 | Al-Hilali et al. | 703/2 |
| 6,653,971 B1 * | 11/2003 | Guice et al. | 342/54 |
| 6,735,596 B2 | 5/2004 | Corynen | 707/102 |
| 6,801,878 B1 * | 10/2004 | Hintz et al. | 702/188 |
| 6,922,632 B2 * | 7/2005 | Foxlin | 701/207 |
| 7,020,046 B1 * | 3/2006 | Baylog et al. | 367/124 |
| 7,109,859 B2 | 9/2006 | Peeters | 340/539.11 |
| 7,286,964 B2 * | 10/2007 | Kim | 702/183 |
| 7,330,844 B2 | 2/2008 | Stoyen | 706/60 |
| 7,363,515 B2 * | 4/2008 | Frazier et al. | 703/2 |
| 7,590,589 B2 * | 9/2009 | Hoffberg | 705/37 |
| 2003/0023534 A1 * | 1/2003 | Kadambe | 705/36 |
| 2003/0191728 A1 * | 10/2003 | Kulkarni et al. | 706/21 |
| 2004/0064735 A1 * | 4/2004 | Frazier et al. | 713/201 |
| 2004/0085218 A1 | 5/2004 | Pecora | 340/815.4 |
| 2004/0119591 A1 | 6/2004 | Peeters | 340/539.26 |
| 2005/0195102 A1 | 9/2005 | Vaman et al. | 342/90 |
| 2006/0010443 A1 * | 1/2006 | Lahti et al. | 718/100 |
| 2006/0018642 A1 | 1/2006 | Chaplin | 396/7 |
| 2006/0167784 A1 * | 7/2006 | Hoffberg | 705/37 |

(Continued)

OTHER PUBLICATIONS

"Multi-sensor management for information fusion: issues and approaches", N Xiong, P. Svenson, Information Fusion 3 (2002) pp. 163-18.*

(Continued)

*Primary Examiner* — Jonathan G. Sterrett
(74) *Attorney, Agent, or Firm* — Baker Botts L.L.P.

(57) ABSTRACT

Analyzing a system includes receiving system performance data indicating performance of one or more sensor systems, operational performance data indicating performance of the sensor systems in one or more scenarios, and cost analysis data indicating one or more cost values associated with the sensor systems. Integrated data is established from the system performance data, the operational performance data, and the cost analysis data. The integrated data is analyzed to establish one or more relationships between at least two of the system performance data, the operational performance data, and the cost analysis data.

15 Claims, 8 Drawing Sheets

U.S. PATENT DOCUMENTS

| | | | | |
|---|---|---|---|---|
| 2006/0213359 | A1 | 9/2006 | Vitale et al. | 89/1.11 |
| 2007/0087756 | A1* | 4/2007 | Hoffberg | 455/450 |
| 2008/0061959 | A1* | 3/2008 | Breed | 340/539.1 |
| 2008/0094212 | A1* | 4/2008 | Breed | 340/541 |
| 2008/0250869 | A1* | 10/2008 | Breed et al. | 73/861.27 |
| 2008/0282817 | A1* | 11/2008 | Breed | 73/865.9 |
| 2009/0046538 | A1* | 2/2009 | Breed et al. | 367/93 |
| 2009/0122641 | A1* | 5/2009 | Hillesund et al. | 367/20 |
| 2009/0143923 | A1* | 6/2009 | Breed | 701/1 |
| 2010/0283626 | A1* | 11/2010 | Breed | 340/825.49 |

OTHER PUBLICATIONS

Ailamaki, et al. "An environmental sensor network to determine drinking water quality and security", Dec. 2003, SIGMOD Record, vol. 23, No. 4, pp. 47-52.*

Krause, et al. "Near Optimal Sensor Placements: Maximizing Information while Minimizing Communication Cost", Dec. 2005, CMU-CALD-05-110, School of Computer Science, Carnegie Mellon University, pp. 1-17.*

Bass, Tim; "Defense-in-Depth Revisited: Qualitative Risk Analysis Methodology for Complex Network Centric Operations", © 2001 IEEE, 0-7803-7725/01, pp. 64-70.*

Charnes, et al. "A Developmental Study of Data Envelopment Analysis in Measuring the Efficiency of Maintenance Units in the US Air Force", 1985, Annals of Operations Research, 2(1985)95-112.*

Air Force Journal of Logistics, Spring 1996, pp. 1-43.*

"Wild Weasel" from Wikipedia discussing the history of SAM suppression. pp. 1-6.*

Coverage problems in wireless ad-hoc sensor networks [PDF] from psu.eduS Meguerdichian, F Koushanfar, M . . . - . . . Joint Conference of . . . , 2002—ieeexplore.ieee.org.*

"SBI*net* Industry", U.S. Department of Homeland Security, U.S. Customs and Border Protection, Office of Public Affairs,www.customs.gov, 4 pages, Mar. 24, 2006.

"SBI*net*: Securing U.S. Borders", Fact Sheet, U.S. Department of Homeland Security, U.S. Customs and Border Protection, www.dhs.gov, 1 page, Sep. 2006.

Communication from the European Patent Office, Communication pursuant to Article 94(3) EPC, dated Oct. 15, 2008—transmitted to Baker Botts LLP via facsimile on Dec. 2, 2008, for European Patent Application No. 07253130.4, 2 pages, Oct. 15, 2008.

Cerpa, Alberto, et al., "ASCENT: Adaptive Self-Configuring sEnsor Networks Topologies", IEEE INFOCOM 2002, 0-7803-7476-2/02, pp. 1278-1287, 2002.

Alliot, Sylvain, et al., *"Architecture Exploration of a Large Scale System"*, Proceedings of the 15th IEEE International Workshop on Rapid System Prototyping (RSP '04), 1074-6005/04 , 8 pages, 2004.

Communication from the European Patent Office, European Search Report dated Nov. 9, 2007—transmitted to Baker Botts LLP via facsimile on Nov. 22, 2007, for European Patent Application No. 07253130.4, 5 pages, Nov. 22, 2007.

* cited by examiner

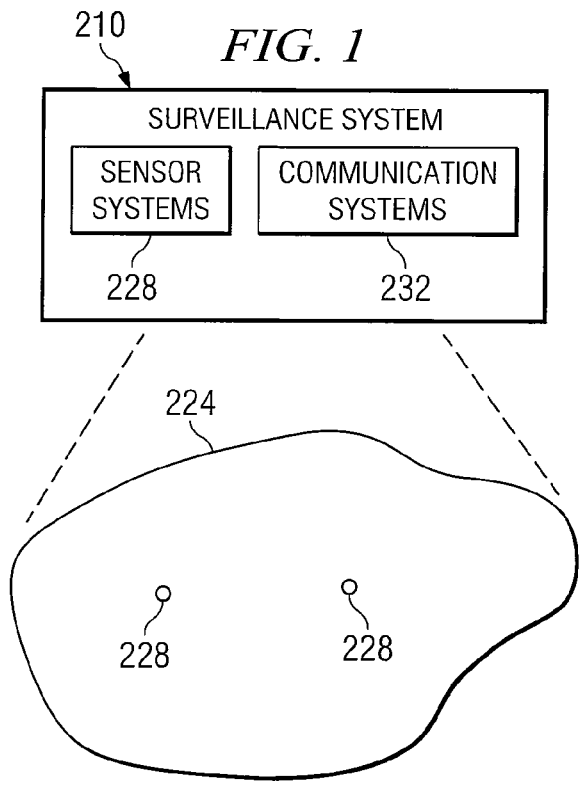
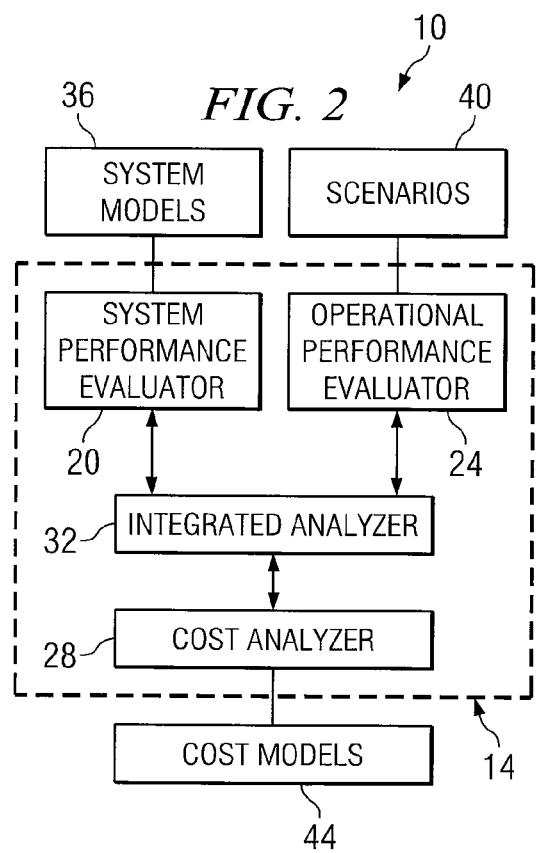

*FIG. 5B-1*

Sensor Class vs Environment

| Class | Environment | | | | | |
|---|---|---|---|---|---|---|
| | Maritime | Desert | Forrested Canopy | Forrested Internal | Mountains | |
| Radar | | | | | | |
| Radar HF Surface Wave | | | | | | |
| FLIR Mid Wave | | | | | | |
| FLIR Long Wave | | | | | | |
| Day TV | | | | | | |
| Passive Acoustic | | | | | | |
| Optical Cable Trip Wire | | | | | | |
| Sonar | | | | | | |
| Seismic | | | | | | |
| UAV | | | | | | |
| Tall Towers | | | | | | |

| Scenario: | Desert/Mountainous Border–United Arab Emirates and Oman |
|---|---|
| Surveillance: | Sensors located in United Arab Emirates Northeast border with Oman Musandam Peninsula |
| Proposed Sensor Suite: | |
| Radar Sensor | Telephonics Advanced Radar Surveillance System (ARSS) Ground Based<br>ARSS-1 Man-Portable<br>ARSS-2 Surveillance Vehicle |
| Justification | Works well in harsh field environment, day/night, and in adverse weather. Rapidly deploys as portable/stationary unit or mounted on vehicle of choice. Operational in full remote mode via fiber optic, RF or Ethernet Links, Radar detection range is 59 meters to 30 Km. Detection Range (Pd=0.9 for single radar scan in optimal weather): Person=7Km; Lightweight Vehicle=15 Km; Heavy Vehicle=25 Km; Hovering Helicopter=10 Km; and Gliders/Ultra Light A/C=5 Km. False Detection=Not more than once in 5 minutes. Detects/Displays moving targets with Radial Velocity minimum=1.8 to 3 Km/Hr and a maximum of~100 Km/Hr. Transmits at eight X Band frequencies (8.75–8.95 GHz). Moving target Doppler signal is converted to audio signal frequencies for recognition and classification of various target types. |

TO FIG. 2B-3

| | |
|---|---|
| FLIR Sensor | Indigo Integrated Long Range IR Surveillance System-IR |
| Justification | Designed for wide area border patrol and coastal surveillance. Fully integrated subsystem with Indigo MWIR cryogenically-cooled camera and companion visible camera, pan/tilt positioner, Integrated Command and Control System (ICCS) with server, complete local cabling set and remote control console software. IR sensor is a 640x512 InSb FPA with 3-FOV Lens (60mm[15.2x12.2deg], 180mm[5.1x4.1deg], 500mm[1.8x1.5deg]). IP66-rated environmental enclosure. High resolution 640x512 Indium Antimonide FPA allows detection of 6' human at ranges up to 14,500 meters. |
| Day TV Sensor | Indigo Integrated Long Range IR Surveillance System-Visible Camera |
| Justification | Companion camera for LR IR camera. Imager=1/2" Interline Transfer NIR CCD (768Hx493V). Focal length=12-660mm with 55X continuous zoom. NFOV=0.6x0.4deg, WFOV=31x22deg. Wavelength=400-900nm NIR. F/#=4.0 to 7.2. |
| Seismic and Acoustic Sensor | MCQ System Remote Alert System (RAS) |
| Justification | Both seismic (geophone) and an acoustic (microphone) sensor used to detect and discriminate people, vehicles, and aircraft. Uses satellite communications (SatCom) link to send information to user. Performs very well as a totally autonomous sensor. Testing indicates very high Pd and correct classification success rate. |

Maritime | Desert&Mountainous | Forest&Mountainous | Desert (Flat)

| SENSOR TYPE | SHORT RANGE FLIR | MEDIUM RANGE FLIR | LONG RANGE FLIR |
|---|---|---|---|
| % COVERAGE | 34.2 | 74.7 | 74.7 |
| AVERAGE DETECTION RANGE (km) | 2.5 | 24.1 | 28.8 |
| SENSOR UNIT COST | $31,824 | $41,047 | $50,124 |
| SYSTEM PRICE | $1,773,001 | $1,672,464 | $1,831,436 |
| INTERCEPT TIME (min) | 0 | 0 | 24.95 |

ANALYZING SYSTEM PERFORMANCE, OPERATIONAL PERFORMANCE, AND COSTS OF A SURVEILLANCE SYSTEM

RELATED APPLICATION

This application claims benefit under 35 U.S.C. §119, (e) of U.S. Provisional Application Ser. No. 60/822,097, entitled "Analyzing System Performance, Operational Performance, And Costs Of A Surveillance System," filed Aug. 11, 2006, by Bruce C. Munro, et al.

TECHNICAL FIELD

This invention relates generally to the field of system simulation and more specifically to analyzing system performance, operational performance, and costs of a surveillance system.

BACKGROUND

A surveillance system may be used to monitor a specific region. During development of the system, portions of the system may be simulated in order to evaluate the effectiveness of the system. Known techniques for simulating surveillance systems, however, are not efficient in certain situations. It is typically desirable to have an efficient simulation of surveillance systems.

SUMMARY OF THE DISCLOSURE

In accordance with the present invention, disadvantages and problems associated with previous techniques for analyzing systems may be reduced or eliminated.

According to one embodiment of the present invention, analyzing a system includes receiving system performance data indicating performance of one or more sensor systems, operational performance data indicating performance of the sensor systems in one or more scenarios, and cost analysis data indicating one or more cost values associated with the sensor systems. Integrated data is established from the system performance data, the operational performance data, and the cost analysis data. The integrated data is analyzed to establish one or more relationships between at least two of the system performance data, the operational performance data, and the cost analysis data.

Certain embodiments of the invention may provide one or more technical advantages. A technical advantage of one embodiment may be that relationships among system performance, operational performance, and costs of a surveillance system may be automatically determined. Automatically determining these relationships may allow for more efficient development of the surveillance system.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 1 is a diagram of an example of a surveillance system that may be analyzed according to one embodiment;

FIG. 2 is a block diagram illustrating one embodiment of a system that may be used to analyze the surveillance system of FIG. 1;

FIGS. 5A through 5E illustrate examples of output from the system of FIG. 2.

DETAILED DESCRIPTION OF THE DRAWINGS

Figure 3:
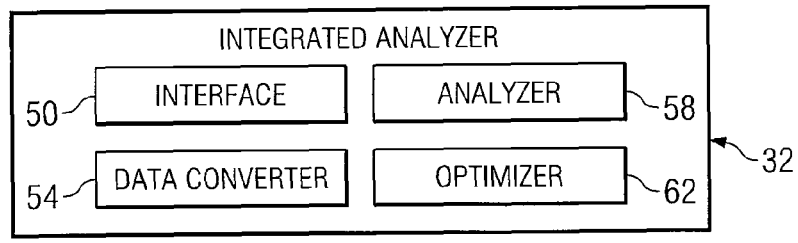
FIG. 3 is a block diagram illustrating one embodiment of an integrated analyzer that may be used with the system of FIG. 2.

Embodiments of the present invention and its advantages are best understood by referring to FIGS. 1 through 5 of the drawings, like numerals being used for like and corresponding parts of the various drawings.

FIG. 1 is a diagram of an example of a surveillance system 210 that may be analyzed according to one embodiment. According to the embodiment, relationships among the system performance, operational performance, and costs of surveillance system 210 may be analyzed.

Surveillance system 210 includes subsystems that perform operations to monitor region 224. According to the illustrated embodiment, surveillance system 210 has subsystems including one or more sensor systems 228 and one or more communication systems 232. A sensor system 228 represents a system that can detect objects. Sensor system 228 may include one or more detectors operable to detect an object. Some detectors may detect energy, such as light, heat, and/or sound, emitted by and/or reflected from the object. Examples of such detectors include infrared, visible light, thermal, sonar, seismic, acoustic, magnetic, and other suitable detectors. Other detectors may detect emissions from an object, such as chemical and/or biological emissions. Sensor system 228 may also generate images of detected objects. For example, sensor system 228 may represent a camera such as an infrared light, a visible light, or a thermal imaging camera.

A communication system 232 communicates information among components of surveillance system 210. Information may refer to voice, data, text, audio, video, multimedia, control, signaling, other information, or any combination of the preceding. Communication protocols and technologies may be used to communicate the information. Example communication protocols and technologies include those set by the Institute of Electrical and Electronics Engineers, Inc. (IEEE) standards, International Telecommunications Union (ITU-T) standards, European Telecommunications Standards Institute (ETSI) standards, Internet Engineering Task Force (IETF) standards, or other standards.

System parameters may be used to describe characteristics of subsystems. Values for the parameters may be used to describe the particular characteristics of a specific subsystem. Characteristics may include physical features and/or abilities. Examples of physical features include size, weight, volume, shape, and/or other physical feature of a system. Examples of abilities include capacity, accuracy, and/or precision. Examples of sensor system parameters may include detection range, detection accuracy, and/or detection reliability. Examples of communications system parameters may include tower height, range, bandwidth, quality of service such as bit error rate, security, and/or power requirements.

According to the embodiment, surveillance system 210 may monitor a region 224 to detect targets 228. Surveillance system 210 may be used to provide security for any suitable entity, for example, a facility, a border, a port, an airport, and/or other entity for which security may be provided.

Region 224 may have any suitable shape or size, which may be selected according to the purpose of the monitoring. As an example, region 224 for monitoring an entryway to a facility may be smaller than region 224 for monitoring the whole facility. As another example, region 224 for monitoring a border of a country may have a linear shape. As another example, region 224 for monitoring the air, land, and/or sea around an airport may have a three-dimensional shape.

Targets 228 may refer to objects that surveillance system 210 is designated to detect. Examples of targets 228 include humans, animals (for example, a camel), and vehicles (for example, an airplane, a truck, or a boat). A target 228 may have a specific signature that identifies the target 228. If surveillance system 210 detects the signature, system 210 may conclude that the target 228 has been detected. Certain targets 228 may be designated as threats. For example, suspicious objects, such as trespassers or low-flying planes, or dangerous objects, such as bombs, may be designated as threats. Surveillance system 210 may send a notification in response to detecting a threat.

Modifications, additions, or omissions may be made to surveillance system 210 without departing from the scope of the invention. The components of surveillance system 210 may be integrated or separated according to particular needs. Moreover, the operations of surveillance system 210 may be performed by more, fewer, or other modules. Additionally, operations of surveillance system 210 may be performed using any suitable logic comprising software, hardware, other logic, or any suitable combination of the preceding. As used in this document, "each" refers to each member of a set or each member of a subset of a set.

FIG. 2 is a block diagram illustrating one embodiment of a system 10 that may be used to analyze surveillance system 210 of FIG. 1. According to the embodiment, system 10 may analyze relationships among system performance, operational performance, and/or costs of surveillance system 210.

According to the embodiment, system performance refers to the performance of a system. Operational performance refers to the performance of a system in a particular scenario. Cost refers to the costs associated with a system. System 10 may analyze any suitable type of relationship, for example, the effect of: system performance and/or operational performance on cost, system performance and/or costs on operational performance, or operational performance and/or costs on system performance. System 10 may also be used to perform optimization, for example, to optimize operational performance while minimizing costs.

According to the illustrated embodiment, system 10 includes one or more modules 14. In general, a module 14 may include any suitable arrangement of components operable to perform the operations of the module 14, and may comprise logic. "Logic" may refer to hardware, software, other logic, or any suitable combination of the preceding that may be used to provide information or instructions.

The one or more modules 14 of system 10 may be embodied in one or more devices of system 10. A device may include logic, an interface, memory, other component, or any suitable combination of the preceding. Certain logic may manage the operation of a device, and may comprise, for example, a processor. "Processor" may refer to any suitable device operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise a Random Access Memory (RAM), a Read Only Memory (ROM), a magnetic drive, a disk drive, a Compact Disk (CD) drive, a Digital Video Disk (DVD) drive, removable media storage, any other suitable data storage medium, or a combination of any of the preceding.

According to the illustrated embodiment, system 10 includes the modules 14 coupled as shown. A module 14 associates input with the appropriate output by processing the input according to specific rules to yield the output. In one embodiment, a module 14 may process input parameter values to generate one or more output parameter values. As an example, a module 14 may process system parameter values that describe a subsystem to generate system performance parameter values that describe system performance of the subsystem. A parameter value may represent a value or a change in a value. For example, a parameter value may describe a feature of a system or a change in the feature of the system.

According to the illustrated embodiment, modules 14 include a system performance evaluator 20, an operational performance evaluator 24, a cost analyzer 28, and an integrated analyzer 32 coupled as shown.

System performance evaluator 20 analyzes relationships between systems and system performance, and provides the results in system performance data. Systems may be described by system parameters, and system performance may be described by system performance parameters. System performance parameters may indicate, for example, the ability of a sensor system to detect a target. The abilities may be ranked, for example, as whether the sensor system can detect, classify, recognize, or identify a target.

According to one embodiment, system performance evaluator 20 may associate system parameter values with system performance parameter values. As an example, system parameter values of a system are processed to generate system performance parameter values that describe the performance of the system. As another example, system performance parameter values designating a desired performance level are processed to generate system parameter values that describe a system that can provide the desired performance level.

System performance evaluator 20 may use a system model 36 to evaluate the performance of a system. System model 36 describes a system, and may include, for example, the system parameter values that describe the system.

Operational performance evaluator 24 analyzes relationships among system performance of systems, scenarios 40 in which the systems operate, and operational performance of the systems in scenarios 40. Operational performance may describe effectiveness of the systems in scenarios 40. Operational performance data may include the results of the analysis.

A scenario 40 represents a situation in which a system is tested to operate. Scenario parameters may be used to describe scenarios 40. According to one embodiment, scenario parameters may describe environments and targets. An environment refers the surroundings of a system, including surroundings that affect the movement or detection of targets 228. Scenario parameters may describe physical features, for example, terrain, physical barriers such as walls or fences, tree lines, and/or buildings. These scenario parameters may take into account different kinds of geologies, for example, desert, mountainous, maritime, and/or forest geologies. Scenario parameters may describe features that affect visibility, such as weather, amount of light, luminance, and/or atmospheric transmittance. These scenario parameters may take into account fog, pollution, sandstorms, snowstorms, and/or bathymetry data.

According to one embodiment, scenario 40 may model a border crossing. Scenario parameters may describe a sensor network, border patrol stations, responder units, and/or threats. Scenario parameters may also describe locations, headings, and/or speeds of intruders and responders.

Operational performance parameters may be used to describe operational performance. Examples of operational performance parameters may describe the effectiveness a system in a scenario 40, which may include the accuracy and/or reliability of the system. In one embodiment, the results from operational performance evaluator 24 may be used to determine sensor system locations that provide optimal operational performance.

According to one embodiment, operational performance evaluator 24 may process system performance parameter values and scenario parameter values to generate operational performance parameter values that describe the performance of a system in a scenario 40. As an example, values describing the lines-of-sight between communication devices may be used to determine values describing the effectiveness of a communication system. As another example, values describing the sensor performance of a sensor system in a scenario 40 may be used to determine values describing the percentage of border crossers that can be detected by the sensor system.

According to one embodiment, operational performance evaluator 24 may process operational performance parameter values and scenario parameter values to generate system performance parameter values that describe systems that satisfy the operational performance parameter values. As an example, values describing the desired percentage of border crossers that should be detected may be used to determine values describing the sensor performance needed to detect the desired percentage.

Cost analyzer 28 establishes the costs associated with the systems. The cost analysis data may include cost values that describe the costs. Cost values may take into account acquisition, implementation, operation, support, life-cycle, and/or total ownership costs. Cost may take into account complexity, weight, volume, and quantity of the sensor systems. Cost may take into account labor, material, project management, development, tooling, and/or other costs. Cost analyzer 28 may use cost models 44 to establish the costs.

Integrated analyzer 32 receives system performance data, the operational performance data, and the cost analysis data. Integrated analyzer 32 analyzes the integrated data to establish relationships between the different types of data. Any suitable type of relationship may be analyzed, for example, the effect of: system performance and/or operational performance on cost, system performance and/or costs on operational performance, or operational performance and/or costs on system performance. System 10 may also be used to perform optimization, for example, to optimize operational performance while minimizing costs. Integrated analyzer 32 is described in more detail with reference to FIG. 3.

Modifications, additions, or omissions may be made to system 10 without departing from the scope of the invention. The components of system 10 may be integrated or separated according to particular needs. Moreover, the operations of system 10 may be performed by more, fewer, or other modules. For example, the operations of system performance evaluator 20 and operational performance evaluator 24 may be performed by one module, or the operations of integrated analyzer 32 may be performed by more than one module. Additionally, operations of system 10 may be performed using any suitable logic.

FIG. 3 is a block diagram illustrating one embodiment of an integrated analyzer 32 that may be used with system 10 of FIG. 2. According to the illustrated embodiment, integrated analyzer 32 includes an interface 50, data converter 54, an analyzer 58, and an optimizer 64.

Interface 50 receives input from system performance evaluator 20, operational performance evaluator 24, cost analyzer 28, and/or other source. Data converter 54 converts the system performance data, the operational performance data, and/or the cost analysis data to yield integrated data. The data may be converted to allow comparisons among the data from different sources.

Analyzer 58 analyzes the integrated data to establish relationships between the system performance data, the operational performance data, and/or the cost analysis data. For example, analyzer 58 may receive data describing a first sensor system with a ten kilometer range and a 25% effectiveness at detecting border crossers, and may establish that the cost of using the first sensor system is $10 million. Analyzer 58 may receive data describing a second sensor system with a fifteen kilometer range and a 30% effectiveness in detecting border crossers, and may determine that the cost of using the second sensor system is $20 million.

Optimizer 64 optimizes an objective in accordance with the one or more constraints. An objective may refer to a parameter that is optimized, and may be expressed as an objective function. A constraint may refer to a parameter value that is fixed. As a first example, system parameter values may be fixed to indicate that a particular system must be used. As a second example, system performance parameter values may be fixed to indicate that a particular system performance must be achieved. As a third example, operational performance parameter values may be fixed to indicate that a particular operational performance must be achieved. As a fourth example, cost values may be fixed to indicate that a there is a budget for the system.

Modifications, additions, or omissions may be made to integrated analyzer 32 without departing from the scope of the invention. The components of integrated analyzer 32 may be integrated or separated according to particular needs. Moreover, the operations of integrated analyzer 32 may be performed by more, fewer, or other modules. Additionally, operations of integrated analyzer 32 may be performed using any suitable logic.

Figure 4:
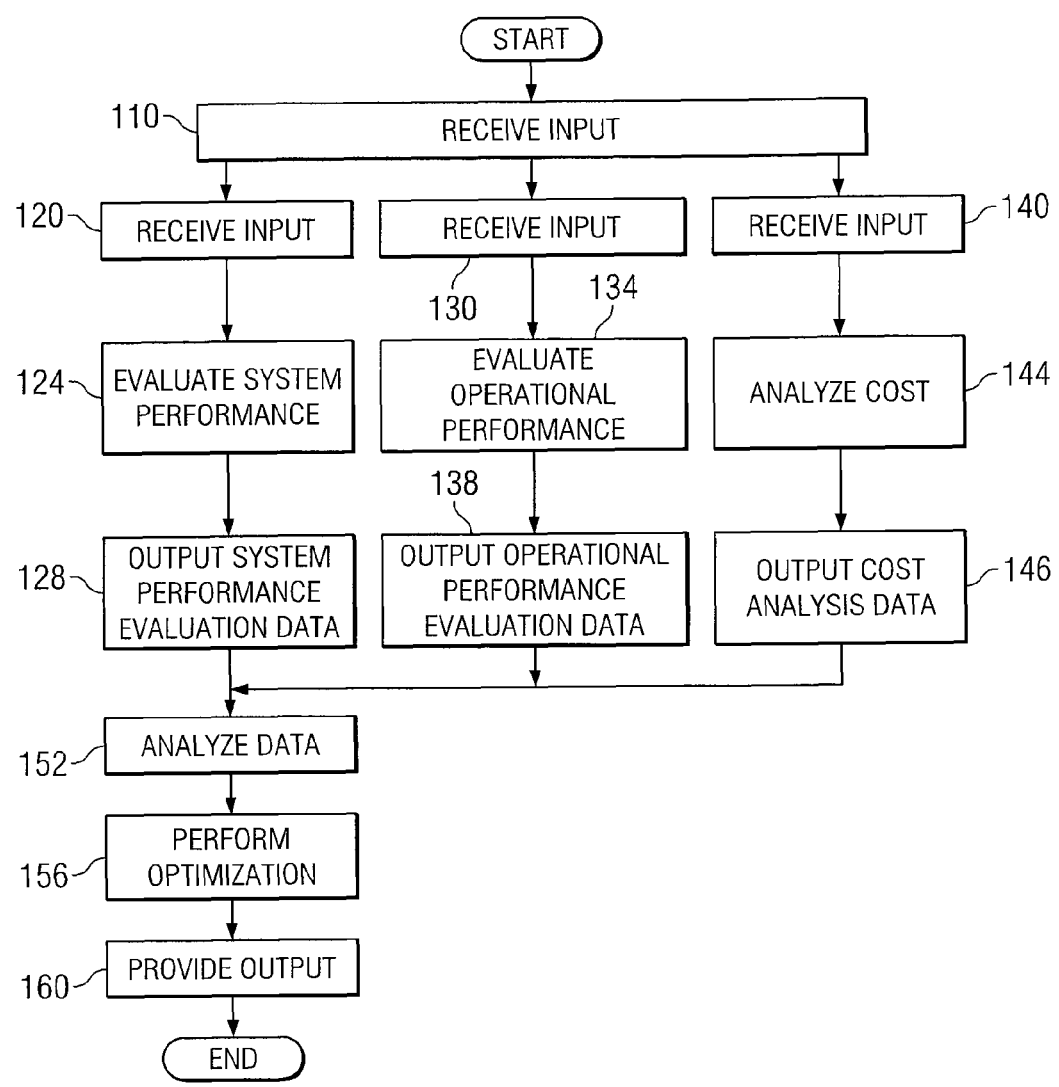
FIG. 4 is a flowchart illustrating one embodiment of a method that may be used with the system of FIG. 2.

FIG. 4 is a flowchart illustrating one embodiment of a method that may be used with the system 10 of FIG. 2. The method begins at step 110, where integrated analyzer 32 receives input. The input may include information for analyzing surveillance system 210, such as initial conditions, parameter values, constraints, and/or other information.

Steps 120 through 148 describe analysis by performance evaluator 20, operational performance evaluator 24, and/or cost analyzer 28. These steps may be performed any suitable number of times and in any suitable order.

System performance evaluator 20 receives input at step 120. The input may be received from any suitable source, for example, sensor models 36 or integrated analyzer 32. System performance evaluator 20 evaluates systems of surveillance system 210 at step 124 to generate system performance data. The system performance data may include system performance parameter values. System performance evaluator 20 outputs the system performance data at step 128. The system performance data may be sent to integrated analyzer 32, operational performance evaluator 23, and/or cost analyzer 28 as input for their analyses.

Operational performance evaluator 24 receives input at step 130. The input may be received from integrated analyzer 32 or scenarios 40. Operational performance evaluator 24 evaluates the performance of the systems at step 134 to generate operational performance data. Operational performance evaluator 24 outputs the operational performance data at step 138. The operational performance data may be sent to integrated analyzer 32, system performance evaluator 20, and/or cost analyzer 28 as input for their analyses.

Cost analyzer 28 receives input at step 140. The input may be received from integrated analyzer 32 or cost models 44. Cost analyzer 28 analyzes the input to generate cost analysis data at step 144. Cost analyzer 24 outputs the cost analysis data at step 148. The cost analysis data may be sent to integrated analyzer 32, system performance evaluator 20, and/or operational performance evaluator 24 as input for their analyses.

Integrated analyzer 32 analyzes the data at step 152. Any suitable type of relationship may be analyzed, for example, the effect of: system performance and/or operational performance on cost, system performance and/or cost on operational performance, or operational performance and/or cost on system performance. Integrated analyzer 32 may perform an optimization at step 156. For example, integrated analyzer 32 may optimize operational performance while minimizing costs.

Integrated analyzer 32 provides output indicating the results at step 160. Output may comprise data that may be used to generate an image describing the results. Examples of output are illustrated with reference to FIGS. 5A and 5E. After providing the output, the method terminates.

Modifications, additions, or omissions may be made to the method without departing from the scope of the invention. The method may include more, fewer, or other steps. Additionally, steps may be performed in any suitable order without departing from the scope of the invention.

FIGS. 5A through 5E illustrate examples of output from the system of FIG. 2. Modifications, additions, or omissions may be made to the output without departing from the scope of the invention. The output may include more, less, or other information. Additionally, the information may be presented in any suitable manner without departing from the scope of the invention.

Figure 5A:
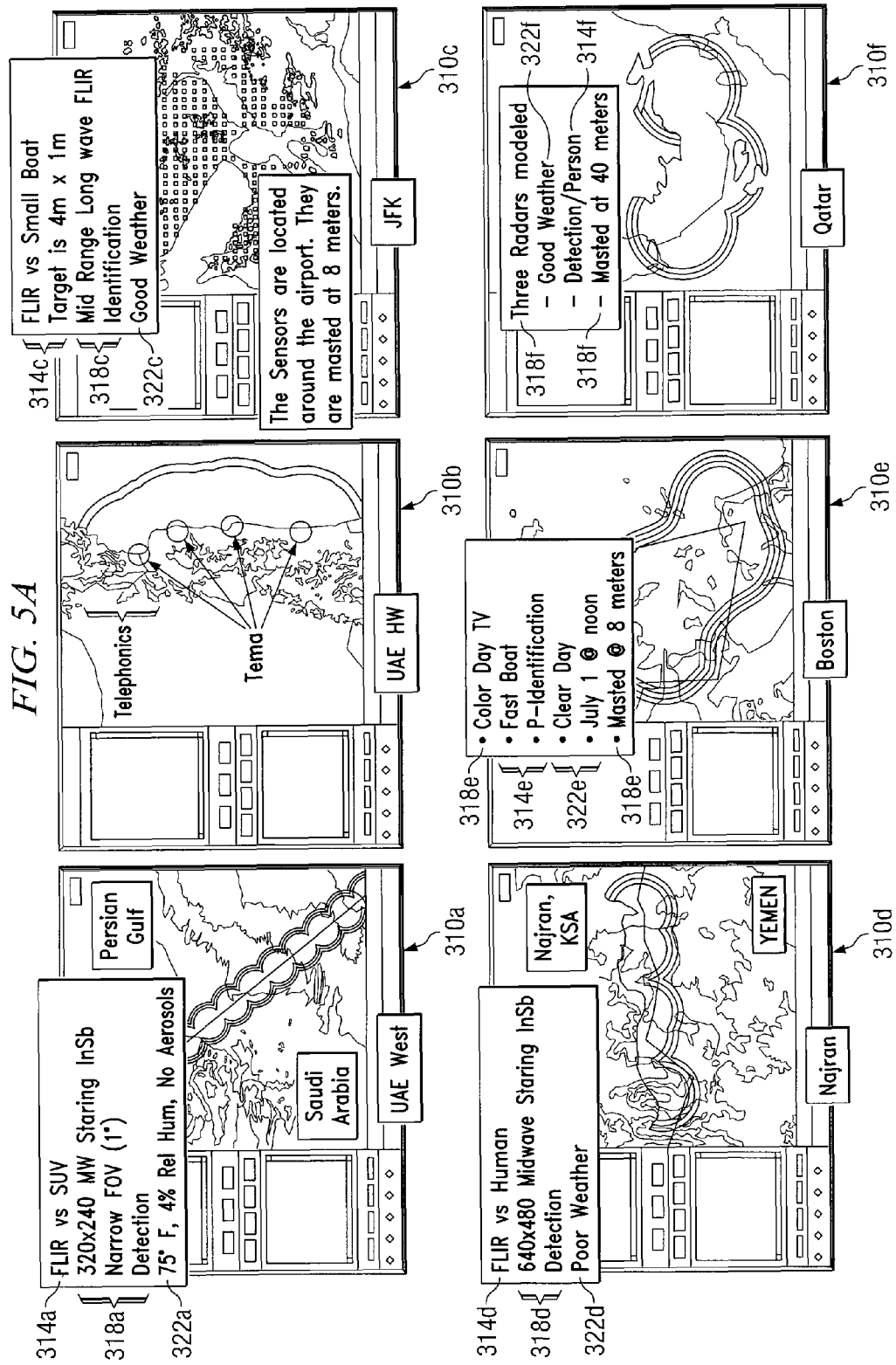

FIG. 5A illustrates examples of displays 310 of operational performance data describing the performance of one or more systems in a particular scenario. Displays 310 may include target information 314 that describes targets, sensor system information 318 that describes sensor systems, and environment information 322 that describes environments.

FIG. 5B illustrates examples of displays that provide information about sensor systems. Display 350 describes classes of sensor systems and environments in which they may be used. Display 352 describes sensor systems that may be used for a particular surveillance system.

Figure 5C:
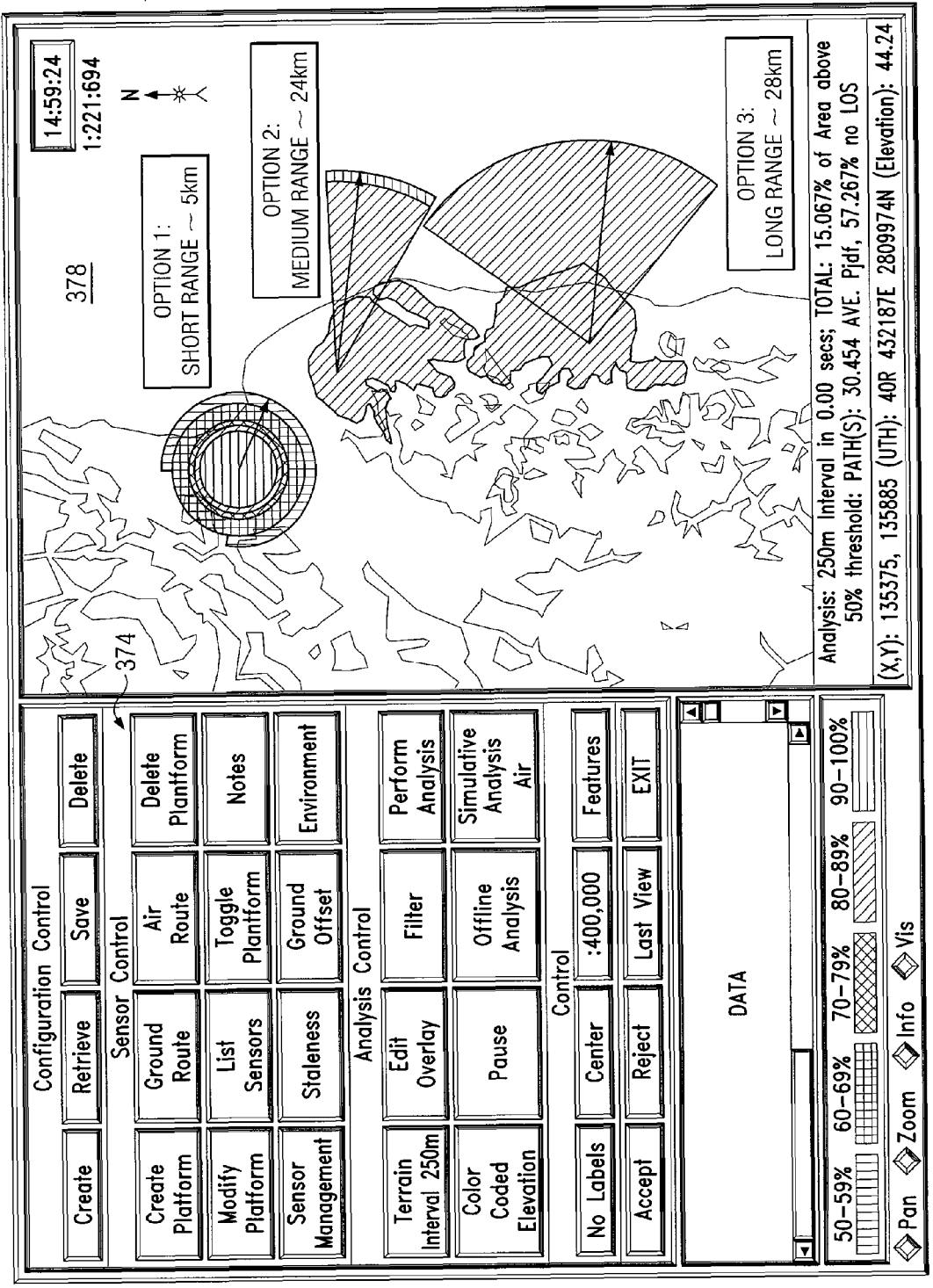

FIG. 5C illustrates an example of a display 370 that may be used to perform a system performance versus cost analysis. Display 370 includes a control window 374 and a graphic display 378. Control window 374 may be used to set the parameters of the analysis. Graphic display 378 shows the effectiveness of different types of sensors in an environment.

Figures 5D, 5E:
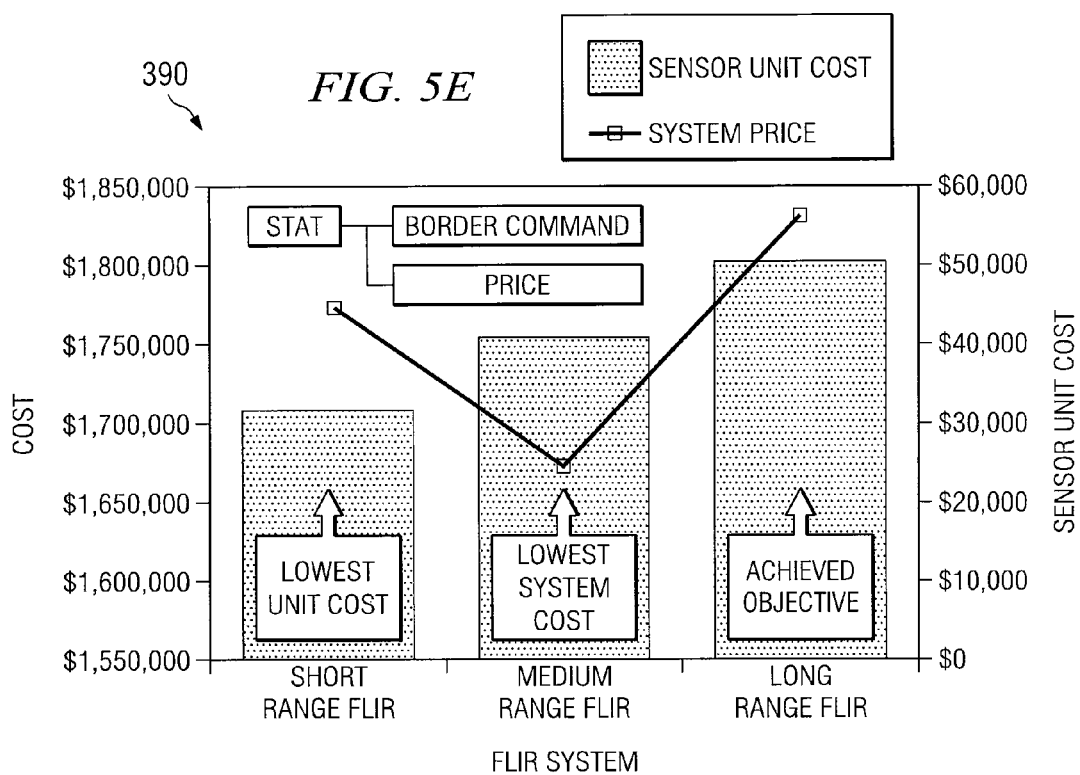

FIG. 5D illustrates an example of a display 380 that describes characteristics of the different types of sensors in the environment described with reference to FIG. 5C.

FIG. 5E illustrates an example of a display 390 of a graph generated from the information described with reference to FIG. 5D. The graph shows the relationships among the sensors and the cost.

Certain embodiments of the invention may provide one or more technical advantages. A technical advantage of one embodiment may be that relationships among system performance, operational performance, and costs of a surveillance system may be automatically determined. Automatically determining these relationships may allow for more efficient development of the surveillance system.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for analyzing a surveillance system, comprising:

receiving system performance data indicating performance of a plurality of sensor systems of a surveillance system, a sensor system comprising an infrared light camera, a visible light camera, a thermal imaging camera, or a radar system, the surveillance system configured to monitor a region to detect a plurality of targets, a target comprising a human, animal, or vehicle, the system performance data indicating the ability of a sensor system to detect, classify, recognize, or identify a target;

receiving operational performance data indicating effectiveness of the sensor systems in detecting one or more targets of one or more scenarios, each scenario describing one or more physical features that affect the detection of the one or more targets;

receiving cost analysis data indicating one or more cost values associated with the sensor systems;

establishing, by one or more processors, integrated data from the system performance data, the operational performance data, and the cost analysis data;

analyzing, by the one or more processors, the integrated data to establish one or more relationships between at least two of the system performance data, the operational performance data, and the cost analysis data;

fixing, by the one or more processors, a sensor system cost value that takes into account complexity, weight, volume, or quantity of the sensor systems to yield a cost constraint, the sensor system cost value being a monetary value;

optimizing, by the one or more processors, an operational performance parameter in accordance with the cost constraint; and selecting a sensor system for the surveillance system based on the optimization.

2. The method of claim 1, wherein a scenario of the one or more scenarios describes an environment of at least one of the sensor systems.

3. The method of claim 1, wherein a scenario of the one or more scenarios describes a target of at least one of the sensor systems.

4. The method of claim 1, further comprising:

providing data operable to generate an image describing the one or more relationships.

5. The method of claim 1, wherein a relationship of the one or more relationships comprises:

the effect of at least one of system performance and operational performance on cost.

6. The method of claim 1, wherein a relationship of the one or more relationships comprises:
the effect of at least one of system performance and cost on operational performance.

7. The method of claim 1, wherein a relationship of the one or more relationships comprises:
the effect of at least one of operational performance and cost on system performance.

8. A system for analyzing a surveillance system, comprising:
one or more memories operable to store:
system performance data indicating performance of a plurality of sensor systems of a surveillance system, a sensor system comprising an infrared light camera, a visible light camera, a thermal imaging camera, or a radar system, the surveillance system configured to monitor a region to detect a plurality of targets, a target comprising a human, animal, or vehicle, the system performance data indicating the ability of a sensor system to detect, classify, recognize, or identify a target;
operational performance data indicating effectiveness of the sensor systems in detecting one or more targets of one or more scenarios, each scenario describing one or more physical features that affect the detection of the one or more targets; and
cost analysis data indicating one or more cost values associated with the sensor systems; and
an integrated analyzer, executed by one or more processors, and in communication with the one or more memories and operable to:
establish integrated data from the system performance data, the operational performance data, and the cost analysis data;
analyze the integrated data to establish one or more relationships between at least two of the system performance data, the operational performance data, and the cost analysis data;
fix a sensor system cost value that takes into account complexity, weight, volume, or quantity of the sensor systems to yield a cost constraint, the sensor system cost value being a monetary value;
optimize an operational performance parameter in accordance with the cost constraint; and
select a sensor system for the surveillance system based on the optimization.

9. The system of claim 8, wherein a scenario of the one or more scenarios describes an environment of at least one of the sensor systems.

10. The system of claim 8, wherein a scenario of the one or more scenarios describes a target of at least one of the sensor systems.

11. The system of claim 8, the integrated analyzer further operable to:
provide data operable to generate an image describing the one or more relationships.

12. The system of claim 8, wherein a relationship of the one or more relationships comprises:
the effect of at least one of system performance and operational performance on cost.

13. The system of claim 8, wherein a relationship of the one or more relationships comprises:
the effect of at least one of system performance and cost on operational performance.

14. The system of claim 8, wherein a relationship of the one or more relationships comprises:
the effect of at least one of operational performance and cost on system performance.

15. A method for analyzing a surveillance system, comprising:
receiving system performance data indicating performance of a plurality of sensor systems of a surveillance system, the surveillance system configured to monitor a region to detect a plurality of targets, a target comprising a human, animal, or vehicle, the system performance data indicating the ability of a sensor system to detect, classify, recognize, or identify a target, a sensor of the sensor systems comprising at least one of:
an infrared light camera;
a visible light camera;
a thermal imaging camera; and
a radar system;
receiving operational performance data indicating effectiveness of the sensor systems in detecting one or more targets of one or more scenarios, each scenario describing one or more physical features that affect the detection of the one or more targets;
receiving cost analysis data indicating one or more cost values associated with the sensor systems, a scenario of the one or more scenarios describing:
an environment of at least one of the sensor systems; and
a target of at least one of the sensor systems;
establishing, by one or more processors, integrated data from the system performance data, the operational performance data, and the cost analysis data;
analyzing, by the one or more processors, the integrated data to establish one or more relationships between at least two of the system performance data, the operational performance data, and the cost analysis data, wherein:
a first relationship of the one or more relationships comprises:
the effect of at least one of system performance and operational performance on cost;
a second relationship of the one or more relationships comprises:
the effect of at least one of system performance and cost on operational performance; and
a third relationship of the one or more relationships comprises:
the effect of at least one of operational performance and cost on system performance;
establishing one or more constraints of at least one of the system performance data, the operational performance data, and the cost analysis data, a cost constraint established by fixing a sensor system cost value that takes into account complexity, weight, volume, or quantity of the sensor systems to yield the cost constraint, the sensor system cost value being a monetary value;
establishing an objective comprising an operational performance parameter to be optimized;
optimizing, by the one or more processors, the objective in accordance with the cost constraint;
selecting a sensor system for the surveillance system based on the optimization; and
providing data operable to generate an image describing the one or more relationships.

* * * * *